United States Patent
Levy

(10) Patent No.: US 11,236,970 B2
(45) Date of Patent: Feb. 1, 2022

(54) ACTIVE SEEKER HEAD SYSTEM

(71) Applicant: ISRAEL AEROSPACE INDUSTRIES LTD., Lod (IL)

(72) Inventor: Shahar Levy, Gedera (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 16/646,607

(22) PCT Filed: Sep. 5, 2018

(86) PCT No.: PCT/IL2018/050988
§ 371 (c)(1),
(2) Date: Mar. 12, 2020

(87) PCT Pub. No.: WO2019/053707
PCT Pub. Date: Mar. 21, 2019

(65) Prior Publication Data
US 2020/0263958 A1   Aug. 20, 2020

(30) Foreign Application Priority Data

Sep. 12, 2017   (IL) .......................................... 254460

(51) Int. Cl.
*F41G 7/22* (2006.01)
*H04N 5/235* (2006.01)
(Continued)

(52) U.S. Cl.
CPC .............. *F41G 7/2246* (2013.01); *G06T 7/20* (2013.01); *H04N 5/2253* (2013.01);
(Continued)

(58) Field of Classification Search
CPC ..................... F41G 7/2246; G06T 7/20; G06T 2207/10016; G06T 2207/10144; H04N 5/2253; H04N 5/2256; H04N 5/2353
(Continued)

(56) References Cited

U.S. PATENT DOCUMENTS 4,024,392 A   5/1977   Teppo et al.
5,200,606 A   4/1993   Minor et al.
(Continued)

FOREIGN PATENT DOCUMENTS

| WO | 03067276 A2 | 8/2003 |
| WO | 2013012474 A2 | 1/2013 |
| WO | 2016121688 A1 | 8/2016 |

*Primary Examiner* — Thai Q Tran
*Assistant Examiner* — Nienru Yang
(74) *Attorney, Agent, or Firm* — Browdy and Neimark, P.L.L.C.

(57) ABSTRACT

Disclosed herein is an active seeker system for detection and/or tracking of moving targets. The system includes: an illumination module generating an illumination beam to be output from the system; an optical assembly for shaping the solid angle of the field of view (FOV) of the output beam; an optical path scanning module adapted for angularly deflecting the output optical path of the output beam about a scan axis to perform one or more scanning cycles; and an imaging module adapted to image light in the spectral regime of the beam, arriving from a certain field of view about the output optical path of the beam. In some cases, the solid angle of the output light beam is shaped such that it has an elongated FOV cross-section extending along a certain lateral of the beam; and the output optical path is angularly deflected in a direction travers to the longer axis of the elongated FOV of beam so as to swipe the elongated FOV of the beam to cover a desired field of regard (FOR) with one dimensional scanning. In some implementations, the system is adapted for monitoring the FOR for detecting and tracking (Continued)

the target. The monitoring may include a target detection stage during which the FOV of the light beam is set to an extent smaller than the FOR and the FOR is imaged in a scanning imaging mode. The monitoring may include a target tracking stage during which one or more imaging parameters are adjusted according to certain estimated properties associated with the target being tracked.

21 Claims, 4 Drawing Sheets

(51) Int. Cl.
 *H04N 5/225* (2006.01)
 *G06T 7/20* (2017.01)
(52) U.S. Cl.
 CPC ......... *H04N 5/2256* (2013.01); *H04N 5/2353* (2013.01); *G06T 2207/10016* (2013.01); *G06T 2207/10144* (2013.01)

(58) Field of Classification Search
 USPC ........................................................ 348/169
 See application file for complete search history.

(56) References Cited

U.S. PATENT DOCUMENTS

| | | | |
|---|---|---|---|
| 5,389,791 | A | 2/1995 | Passmore |
| 6,169,594 | B1* | 1/2001 | Aye ........................... G02F 1/29 |
| | | | 349/196 |
| 7,940,377 | B1 | 5/2011 | Schmitt et al. |
| 2003/0090647 | A1 | 5/2003 | Isogai et al. |
| 2004/0021852 | A1* | 2/2004 | DeFlumere ........... F41G 7/2246 |
| | | | 356/141.1 |
| 2007/0216878 | A1 | 9/2007 | Takashi et al. |
| 2012/0002049 | A1* | 1/2012 | Fry ....................... F41G 7/2253 |
| | | | 348/148 |
| 2015/0268345 | A1* | 9/2015 | Ell .......................... G01S 3/784 |
| | | | 356/5.01 |

\* cited by examiner

ACTIVE SEEKER HEAD SYSTEM

TECHNOLOGICAL FIELD AND BACKGROUND

Seeker heads (herein after also referred to interchangeably as seeker) are guidance systems, typically mounted on movable platforms such as missiles, which are operable to capture/image radiation returning from a target (e.g. emitted and/or reflected/scattered radiation) and process captured/image radiation to detect the target and thereafter track and follow the target.

Seeker heads can be divided in to two principal types: passive seekers which do not actively illuminate the target with radiation beam, and active seekers which generally include a radiation sources for illuminating the target.

An example of a passive seeker head is disclosed for instance in U.S. Pat. No. 5,389,791 disclosing a conventional rate-stabilized IR seeker fitted with an improvement that results in a wider FOV as well as much-reduced image smear. The improvement includes a circular optical wedge rotatably mounted in front of the optics assembly of the seeker sensor. The combination of the primary scan vector generated by the circulating sensor of the seeker and the secondary scan vector generated by the rotating wedge produces a scan pattern that has a wider total FOV than that of the sensor alone while at the same time providing occasional points of zero or near-zero spatial scan velocity. Such points allow collection of "snapshot" data with little or no image smear.

A drawback of the passive seeker types is that the signal emission (intensity) from the target cannot be controlled by the interceptor, and may depends on many unpredictable parameters, such as target emissivity, target temperature, target trajectory etc. Therefore the signal to noise ratio (SNR) for these type of seeker heads may be relatively low. This is because the passive seekers generally do not include any radiation source, and do not actively illuminate the target but are only configured to detect radiation emission/scattering/reflection from the target.

It should be noted that in the following description the term SNR is used to designate ratio of the signal intensity to both the instrumental noise of the detector and the background (e.g. clutter) radiation senses by the detector. This drawback may be significant particularly when highly agile detection and tracking is required for following high angular velocity targets (due to target high speed, or large miss-distance), because in such cases detection should be carried out at high rates (short exposure times), and thus the signal intensity acquired at each image and accordingly the SNR, may be inferior, and may prevent reliable detection and/or tracking by passive seekers.

In some cases, in order to overcome the drawbacks of passive seekers, active seekers are used, which generally also include a radiation source (e.g. light source) in addition to the radiation detector. The radiation source is used to actively illuminate the target, so that sufficient radiation intensity returns from the target. Active seekers therefore typically provide improved seeking performance since the target is actively illuminated by the active seeker head and thus the intensity of the signal returning from the target and accordingly the SNR may be much higher than possible with passive seeker systems.

Examples of active seeker systems are disclosed for instance in U.S. Pat. No. 5,200,606, which discloses an apertured mirror that permits an outgoing, transmitted laser beam to pass and reflects a return reflected beam onto a detector array; and in U.S. Pat. No. 4,024,392, which discloses a gimballed active optical system having a laser beam output which coincides with the gimbal system instantaneous field-of-view over wide angles to produce an active laser seeker.

GENERAL DESCRIPTION

As described above, active seeker heads (active seekers) are conventionally used for detection and tracking of moving targets, particularly when reliable and agile detection and tracking of fast moving targets (e.g. targets having high angular velocity) is required.

A major drawback of conventional active seekers arises from the fact that they require a powerful radiation source to illuminate the field of regards (FOR), namely the entire solid angle at which the target is expected, in order to detect the target, reliably and within sufficiently short detection time T. As a result, due to the need for using a powerful radiation source, the payload of the seeker head which is carried by the platform (e.g. missile) carrying the seeker head should also include relatively large and heavy power source to power the radiations source. Accordingly the weight and optionally also the size of the active seeker head payload (including the seeker head itself and its power source) might become too heavy/large for being carried by agile platforms (e.g. interceptors). This imposes severe limitations on the platform and missions in which active seeker heads can be employed (e.g. depending on the size of the platform which is to carry the active seeker head and/or the duration of the platform's mission).

The present invention provides a novel active seeker head system and method for improving the above drawbacks of conventional active seeker head systems. Advantageously, the requirement for employment of a powerful radiation source is substantially relaxed with the seeker head system and method of the present invention.

The invention is based on the inventors' understanding that in order to achieve reliable homing to fast moving targets, different radiation illumination schemes with different and/or dynamically adjusted imaging exposure/integration times $\tau$ and/or with different and/or dynamically adjusted total FOR frame capturing times (FCT) should be employed during different stages of detection and tracking operations of the system. In this regard it should be noted that the phrase fast moving targets is used herein to indicate targets that may acquire large angular velocity relative to the platform (e.g. an interceptor), as observed from the seeker reference frame. To this end it should be understood that the phrases exposure time $\tau$ and/or integration time are used herein interchangeably to designate the exposure time of the imaging module for capturing an image. The phrases FOR frame capturing time and/or FOR capturing time (also abbreviated herein as FCT) are used herein to designate the total time required for capturing imagery data indicative of the entire FOR. When operating in snapshot mode, the entire FOR is captured in a single image and therefore the FOR frame capturing time (FCT) T actually equals the exposure time $\tau$. However, when operating in a scanning mode, M images are grabbed to cover the entire FOR and thus in this case the FOR frame capturing time (FCT) may be the sum of exposure times $\tau$ of the M images (whose exposure times may be different and adjusted dynamically according to the present invention).

Accordingly, according to various embodiments of the invention, the active seeker head is configured and operable for dynamically adjusting various parameters of the illumination and imaging scheme, by which the target is to be illuminated and imaged in accordance with the operational stage of the system (e.g. target detection stage and/or target tracking stage) and/or in accordance with the distance of the target from the seeker head. The adjusted parameters may include for example the illumination intensity, FOR ($\Omega$), imaging exposure time ($\tau$), FCT (T), etc.

In this regards the following should be noted. The term FCT is used herein to designate the total time (T) during which the system acquires image(s) covering of the entire FOR. This set of images (per each FOR capturing cycle) is referred to herein as FOR frame data/image. The FOR frame data may be acquired by the technique of scanned imaging, in which case the information of the FOR frame is composed of several (e.g. M) images of different FOVs captured during a scanning cycle. Alternatively or additionally, the FOR frame data may be acquired by the technique of or by the technique of snapshot imaging which case the information of the detection frame is typically composed of one snapshot image whose FOV is equal or greater than the FOR. The term field of regard (FOR) is used herein to designate the entire solid angle being imaged at each frame period. The term illumination and imaging mode is used herein to designate the illumination and imaging technique which is used to capture the FOR frame images of the FOR at which the target is expected to reside. This may include a snapshot imaging mode, and a scanned imaging mode.

In the snapshot imaging mode the system operates at a frame rate whereby at each frame period, the entire FOR is simultaneously flooded by the illuminating radiation and a snapshot of the entire FOR is captured on the detector/imager. In this case the solid angle field of view (FOV) of the projected illumination radiation is set to cover the entire FOR and is therefore equal or larger than the solid angle of the FOR. Accordingly also the FOV of the imaging system is set in this mode to be equal or larger than the FOR.

It should be noted that the term field of view (FOV) is used herein to generally designate the solid angle of imaging and/or of illumination. In various implementations of the system according to the present invention the FOVs of the imaging and of the illumination may not be similar, and more specifically may have different extents/solid angles. To this end, the Imaging FOV (indicated herein I-FOV) is the total FOV of the imaging system. Illuminator FOV, being the solid angle of the illuminator beam is referred to as L-FOV.

In the scanned imaging mode the illumination radiation is projected onto the FOR with a field of view (FOV) solid angle that is substantially smaller than the FOR. In this case, the frame period corresponds to a scanning cycle during which the illumination radiation is scanned to cover the entire FOR. At each "step" of the scanning cycle lasts a certain "integration period" during which the imager/detector is operated to capture at least a part of the FOR that is illuminated by the beam of the illumination radiation (namely at least the part of the FOR that overlaps with the FOV of the illumination beam). Thus, at the end of a scanning cycle, a plurality of images are obtained collectively composing a detection frame information indicative of the radiation response (reflection/scattering) obtained from the reflection/scattering of the illumination beam scanned over the entire FOR.

To this end, according to various embodiments of the present invention, one or more of the above parameters, being one or more of the following (1) the illumination and imaging mode; (2) the frame rate; and (3) the solid angle of the FOR, are dynamically adjusted during operation of the system in order to optimize the illumination and/or more specifically to optimize the SNR of the radiation returned in response from the target, during system operation.

For instance, according to some embodiments the system is configured and operable in two operational modes: Detection Mode, and Tracking Mode. During the detection mode, there may be no information, or only approximated information (e.g. which may be provided from external sources such as a remote radar system) on the target's location relative to the seeker head. In this case, under the assumption that the target may be quite remote from the seeker head, the seeker head operates in the scanned imaging mode, such that for a given illumination/radiation source of the system (having a given output intensity), the SNR of the signal returning from the target is optimized (e.g. maximized). The scanned imaging mode provides for optimizing the SNR in this case because in this mode the FOV of the illumination beam is much smaller than the FOR. Therefore the flux of the illuminating radiation which falls on the target, and accordingly also the instantaneous intensity of the radiation returning (reflected/scattered) from the target, are stronger when operating in the scanning mode. As a result, the received SNR is enhanced.

More specifically, the inventors of the present invention have noted that the scanning imaging mode is advantageous in terms of the SNR obtained for a given frame rate (for a given scanning cycle duration) and illumination power P (being the total output power of the illumination module of the system) as compared to the snapshot imaging mode. This is because in the scanning mode during each scanning cycle (which lasts a framed duration T being one over the frame rate) a sequence of a number of images (e.g. M images) of the FOR is acquired, whereby each image is grabbed/integrated over a smaller integration time (also referred to herein as exposure time) $\tau$, so that the sum of all M exposure times equal T (the exposure times are not necessarily equal). Therefore the amount of noise N (i.e. clutter noise and possibly also instrumental noise) that is collected in the image is smaller as compared to the snapshot imaging mode, in which the single image is grabbed over an integration time $\tau$ that matches the frame period $\tau \sim T$. On the other hand, in the scanning mode, during the integration time $\tau$ of each of the images being captured, only a part of the solid angle $\Omega$ of the FOR (being the FOV of the illuminator in the scanning mode) is illuminated. This part is the solid angle $\phi$ of the FOV of the illuminator, and may be up to M times smaller than the solid angle $\Omega$ of the FOR, $\Omega \sim M\phi$ (since M images are used to cover the FOR), and therefore for the given illuminator power P, the flux (being the power transferred to unit area) is up to M times larger in the scanning mode.

Another advantage of the shorter integration time is that the target crosses fewer pixels on the detector in each frame, an affect that improves SNR. The target may cross pixels on the detectors, during the exposure time, due to its angular velocity with respect to the seeker.

However the scanning imaging mode may be advantageous in terms of SNR, in some cases/scenarios, the scanning also introduces some difficulties, particularly when tracking moving targets. This is because scanning imaging mode, particularly in cases where high speed scanning is used, may result with side effects as scanning jitters (e.g. due to vibration or other disturbances), and/or with so called rolling shutter effects, which might in turn yield less accurate detection and location of the target. Moreover, high speed scanning may require fast motors for operation the scanning gimbals/mirrors and stabilizing them against vibrations. These may be in turn heavy and power consuming (requiring heavy/large power source), and thus less suitable for use with seeker heads that are to be mounted on relatively small and agile platforms. Moreover, scanning may be less effective when it comes to detection and tracking of fast moving targets. This is particularly due to the so called rolling shutter effect of the scanning. More specifically the rolling shutter effect may be expressed in case the target's angular velocity relative to the system (relative to the seeker head (e.g. relative to the platform carrying the seeker head is large). This is because, while image scanning captures sequential set of images of different parts of the FOR, a fast moving target (with high angular velocity) within the FOR may be missed for example in case at the integration time $\tau_1$ at which, the target is located at FOV-B part of the FOR, and by the time $\tau_2$ the scanning moves to illuminate and image FOV-B part of the FOR the target has already moved to FOV-A. Thus, due to the rolling shutter effect of the scanning, it might be preferable to avoid high speed scanning in cases the target might be moving with high angular velocity relative to the system. In this regards it shout be understood that the term rolling shutter effect/artifact is used herein to designate effects associated with the scanning, and does not pertain to the particular shutter/readout operation of the imaging sensor which may be configured in various embodiments for operating in global and/or rolling shutter.

The present invention provides several techniques which alone or in combination allow to mitigate the above mentioned deficiencies of the scanning imaging mode, while also gaining the SNR advantages of the scanning imaging mode that allow using the less powerful and thus smaller and lighter illumination module and power sources.

According to some implementations, the seeker of the present invention is configured for operating a one dimensional scanning mode to cover the FOR. In this case, an elongated illumination beam (e.g. whose cross-section's aspect ratio is about 40) is scanned in one direction traverse (e.g. perpendicular) to the longer dimension of its aspect ratio (that may be generally lateral scanning of the beam or rotation of the beam's cross-section over an axis substantially parallel to its optical path). Using a one dimensional scan with an elongated beam has several advantages over a two dimensional scan (e.g. raster scan or the like) of a typically spot like beam. This is because two dimensional scan, which typically has a "fast" scan axis along which the illumination beam's spot moves very fast, and a "slow" scan axis along which the beam spot, moves much slower, hence one dimensional scanning eliminates the need to scan along the "fast" scanning axis, (since in this case of the 1D scan the entire span of the "fast" axis is illuminated and captured in a snapshot in each image of the scanning). This in turn reduces the need for utilizing fast scanning actuators (e.g. gimbal motors) for carrying out scanning along the fast axis. This is because in this case the system employs the one dimensional scan of an elongated illumination beam over the FOR in which the wide side/dimension of the beam's cross-section entirely covers the one dimension of the angular span of the FOR while at each scan step capturing snapshot images with FOV covering the entire FOV of the elongated illumination beam. Accordingly embodiments of the seeker head of the present invention in which the one dimensional active scanning of the FOR is employed, may not require fast and powerful scanning actuators, and may only include slower and less powerful actuators (gimbal motors) and therefore also smaller and lighter battery/energy-source. Moreover, when utilizing slower one dimensional scanning, jitter effects scanning are also mitigated.

Yet additionally one dimensional scanning is also advantageous in terms of rolling shutter effects. Particularly in this case rolling shutter effects may be expressed only along the one dimensional scanning axis, while also along this scanning axis the artifacts of the rolling shutter effects are smaller and less significant, since the elongated beam swipes the FOR along one dimension only, thereby reducing the chances of a target existing in the FOR to disappear from the scanning.

Moreover, according to some embodiments of the present invention one dimensional scanning is performed along a preferred scanning direction, with respect to which the angular velocity of the target relative to the seeker head is expected to be relatively small. This improves/reduces the above mentioned rolling shutter effects, which are to a large extent dependent on the angular velocity of the target, and thus improves the reliability of the system in detection and tracking of the target. Indeed, in some implementations of the system the scanning direction may be controlled/adjusted (e.g. by the controller of the seeker head) so that it can be adjusted to the preferred direction, while in other embodiments the scanning direction is fixedly set to the preferred direction. For example, in many cases the target's velocity in the horizontal direction/plane is expected to be much larger than its vertical velocity. Accordingly, in turn also the angular velocity of the target in the horizontal axis (in the yaw plane) relative to the seeker head may be high compared to the possible values the angular velocity of the target may acquire in the vertical axis (in the pitch plane) relative to the seeker head. Therefore, in some embodiments the scanning direction is set/adjusted/controlled to be in the vertical direction (scanning in the pitch direction) whereby the illumination beam is shaped to be elongated horizontally (in the yaw direction). This substantially eliminates rolling shutter effects which may arise due to the target's angular velocity in the horizontal/yaw plan.

It should be noted, that the scanning imaging mode, as described in the various embodiments above, may also continue after the target is detected. For example, the scanning imaging mode may be carried out as long as the target's distance is large and prevents acquiring sufficient SNR in the snapshot imaging mode. However, in some embodiments, once the target is detected, and during the tracking mode, various parameters of (1) the illumination and imaging mode; (2) the exposure time $\tau$; (3) the frame rate 1/T; and (4) the solid angle of the FOR, may be dynamically adjusted during the tracking operational mode (e.g. based on the target's distance and velocity) in order to optimize illumination and/or more specifically to optimize the SNR of the radiation returned in response from the target, during the tracking operation, while possibly also optimizing the frame rate 1/T and thus optimizing the agility of tracking the target. Additionally, in case one dimensional scanning is employed, the direction of the one dimensional scanning may be dynamically adjusted as indicated above based on the angular velocity of the target relative to the seeker head in order to mitigate/reduce rolling shutter effects of the scanning.

Thus, the system may continue to operate at the scanned imaging mode for example until the target is close enough so that for the given illuminator of the system, the SNR of the returned radiation from the target would be sufficiently high (i.e. above a certain required SNR threshold), even when operating in the snapshot imaging mode.

To this end, according to some embodiments of the present invention when the target is close enough, thus occupying a larger part of the FOR, yielding high enough SNR, the controller of the system changes the mode of operation of the illumination and imaging to snapshot mode. This is advantageous because the angular velocity of the target relative to the system reaches higher values as the target becomes closer.

Accordingly, operation in the snapshot mode avoids rolling shutter effects of the scanning, and provide more reliable tracking. In this mode, the FOV of the illumination beam is expanded/adjusted (e.g. utilizing a beam expander) to cover/flood the entire FOR simultaneously, and possibly also the FOV of the imaging is adjusted accordingly so as to cover at least the FOV of the illumination beam. Accordingly an image of the entire FOR is sequentially captured without a need for scanning. As will be described below, depending on the SNR from the target, the frame rate T of the imaging may be adjusted/increased dynamically as the target approaches, as long as the SNR is preserved above a certain minimal threshold level. This enables to achieve better tracking agility for close targets, which might be moving at high angular velocities relative to the seeker head.

Alternatively or additionally, according to some embodiments the system is configured and operable for dynamically adjusting the frame rate at which the system operates depending on the expected distance of the target from the system (and/or possibly in accordance with the operational modes of the system, be it Detection or Tracking Mode). Indeed, the further the target, it occupies a smaller portion of the solid angle of the FOR of the system. Actually, for a given illumination intensity flux, the returned (scattered flux) received by the detector/image is proportional to $R^{-4}$, where R is the distance to the target. Therefore, according to some embodiments of the present invention, the frame rate of the imaging (be it in scanning mode or snapshot mode) is adjusted to be proportional to about $R^4$ such that for the given intensity of the illumination beam, sufficient signal (sufficient intensity) of the radiation returning from the target would be collected on the detector/imager. This in turn dynamically optimizes (e.g. stabilizes) the SNR of the detected signal from the target while the target may be at various distances.

In this regard, it should be noted that actually, intensity of the radiation returning from the target may be dependent not only on the distance of the target, but also on the size of the target, or, more specifically on the cross-section area of the target that covers the field of regard. To this end, in some embodiments the frame rate is adjusted in accordance with an estimated/determined number of detector pixels that are illuminated by the radiation returning (scattered/reflected) from the target. This is because the number of illuminated pixels is actually indicative of both the size (cross-sectional projection) of the target in the FOR and the target's distance.

Moreover, in some embodiments the solid angle of the FOR itself is dynamically adjusted during the system's operation, for example depending on the operational mode of the system and/or depending of the distance of the target or the number of detector pixels illuminated by the radiation returning from the target. More specifically for example, during the detection operational mode of the system (at which the target is searched for and not yet detected/identified), the FOR of the system may be set to cover a relatively large solid angle (e.g. within the range of $6e^{-6}$ to $50e^{-6}$ steradian), so that during each frame period a large FOR is covered in search for the target. After the target has been detected (i.e. during the tracking operational mode), the FOR of the system may be set to cover a substantially smaller solid angle, as long as it is large enough to ensure that the moving target is maintained within the FOR so that continuous tracking is possible. In this regards, it is noted that the smaller the FOR, the higher the illumination flux from the given illuminator (e.g. radiation/light source of the system), accordingly the better the SNR of the signal returning from the target and captured by the detector for a given distance of the target, for a given frame rate. Therefore, this allows either utilizing higher frame rates to achieve a desired SNR, or it allows inclusion of an illumination source of reduced power in the system, while achieving sufficient illumination of the target for tracking it even from a relatively large distance range.

In this regard, it is also noted that, generally, the further the target is (the greater its distance from the seeker head system), the smaller the angular velocity of the target may be, relative to the system (provided a certain given speed of the target), and therefore a smaller FOR is required in order to ensure that the target remains within the seeker head's FOR, in the successive FOR frame capturing cycle. Accordingly in some implementations, during the tracking mode, the system operates to vary the FOR of the system in accordance with the estimated distance of the target from the system and/or in accordance with the angular velocity of the target relative to the system (the angular velocity of the target may be estimated for example by comparing the change in the target location in between successive frames). Generally, the FOR may be adjusted to cover a larger solid angle as the target becomes closer to the system and/or its relative angular velocity increases. The controller is configured to dynamically adjust the FOR during the tracking mode to typically increase its solid angle as the target approaches in order to ensure that (1) the target remains within the FOR in the successive frame(s), and (2) preferably (within the limitation of the system) ensure that during most of the detection mode (i.e. until the target is very close to the system), the entire target is captured in each frame.

In accordance with yet another aspect of the present invention the system is configured and operable for further improving the SNR of the target detection by providing and utilizing means for assessing the amount of clutter radiation in the environment surrounding the target. To this end, according to some embodiments the imager and the illumination beam are directed to cover substantially overlapping fields of view FOVs, while the FOV of the imager is adjusted/configured to be larger than the FOV of the illumination beam and further extends beyond the FOV of the illumination beam, at least during the scanning imaging mode. Accordingly, signals of radiation returning from the target are expected to be provided only from those pixels of the detector whose FOVs overlap with the FOV of the illumination beam projected (since the signal from the target is based on radiation of the illumination beam that is being reflected from the target). Other pixels, whose FOVs do not overlap with the FOV of the illumination beam, are considered to sense only clutter radiation (since these pixels cannot receive the illumination beam radiation that is being reflected/scattered from the target). Thus, according to some implementations, the controller processes some pixels, which are outside of the L-FOV, to estimate the level clutter noise.

Thus, According to one prominent aspect of the present invention there is provided a novel and inventive active seeker systems and methods. The active seeker system/method of this aspect includes:

An illumination module configured and operable for generating an illumination beam for propagation along an output optical path of the system;

An optical assembly comprising a beam shaper adapted adjusting a field of view (FOV) solid angle of the light beam to form an output light beam with the adjusted FOV propagating along the output optical path of the system;

An imaging module operable for imaging light in the spectral regime of the light beam arriving from a certain FOV about the output optical path;

An optical path scanning module configured and operable for angularly deflecting a direction of the output optical path about a scan axis to perform one or more scanning cycles; and A control system configured and operable for operating the optical assembly, the imaging module and the optical path scanning module for monitoring a field of regard (FOR) for detection and tracking of a target. According to the this aspect of the present invention the monitoring includes carrying out a target detection stage for detecting the target within a predetermined FOR, wherein sad target detection stage comprises:

(i) setting the FOR to first extent;

(ii) Operating the optical assembly to adjusting the FOV of the light beam to extent smaller than the FOV;

(iii) Operating scanning module and the imaging system in a scanning imaging mode to obtain a FOR frame image data by scanning the FOR with the illumination beam and capturing a plurality of images of different sections of the FOR; and (iv) Processing the plurality of images to identify therein image pixels indicative of the target and thereby detecting the target.

In some embodiments, in operation (iii) above, the control system is configured and operable to dynamically adjust exposure times of the plurality of images during the capturing of the plurality of images to thereby optimize a time required for the detection of the target. For example the exposure times may be dynamically adjusted based on an estimated distance of the target during the detection stage.

According to some implementations, upon detecting the target, the systems carries out a target tracking stage for tracking the target. In some embodiments, carrying out the tracking stage includes sequentially capturing a plurality of FOR frames image data indicative of the FOR, and processing each FOR frame image data of the FOR frames image data to identify the target therein. The controller is adapted to dynamically adjust at least one of the following parameters of the capturing of one or more of the FOR frames image data during the tracking:

(i) A solid angle extent of the FOR being captured in each FOR frame image data;

(ii) Frame rate 1/T for the sequential capturing of the FOR frame image data;

(iii) A selected imaging mode for capturing the FOR frame image data wherein the selected imaging mode may be one of a scanning imaging mode and a snapshot imaging mode.

According to some implementations, the solid angle extent of the FOR of capturing a certain FOR frame image data is adjusted based on an estimated angular velocity of the target appearing in preceding FOR frames image data.

According to some implementations, the Frame rate 1/T for capturing a certain FOR frame image data is adjusted based on an estimated SNR of the target in preceding FOR frames image data.

According to some implementations, the selected imaging mode for capturing a certain FOR frame image data is adjusted based on an estimated distance of the target.

According to yet another prominent aspect of the present invention there is provided a novel and inventive active seeker systems and methods. The active seeker system/method of this aspect includes:

An illumination module configured and operable for generating a light beam for propagation along an output optical path of the system;

An imaging module operable for imaging light in the spectral regime of the light beam arriving from the output optical path;

An optical assembly comprising a beam shaper adapted for shaping the light beam to form an output light beam with an elongated cross-section extending along a certain lateral axis traverse to the output optical path for illuminating a certain field of view; and An optical path scanning module configured and operable for angularly deflecting a direction of the output optical path about a scan axis to perform one dimensional scanning cycle by swiping the field of view of the elongated output light beam to cover a field of regard (FOR).

According to some embodiments the beam shaper is configured and operable for shaping the light beam such that the field of view of the elongated output light beam has a line shape with an lateral aspect ratio of the order of 40 between the wide and narrow lateral dimensions of the elongated light beam. Alternatively or additionally according to some embodiments the elongated output light beam extends to cover a first lateral dimension of the FOR. The optical path scanning module is configured and operable for carrying out the one dimensional scanning cycle by deflecting the direction of the output optical path to scan a certain angular extent about the scan axis so as to swipe the light beam to cover a second dimension of the FOR being imaged in the one dimensional scanning cycle.

In some embodiments the system includes a control system connectable to the imaging system and configured and operable for monitoring the field of regard in search for the target by receiving sequence of images captured by the imaging system during the one dimensional scanning cycle. The control system is adapted for processing the images for detecting the target illuminated by the light beam. The detecting includes determining whether returning light of the light beam being reflected/scattered from the target is captured by one or more pixels of at least one image in the sequence of images. For instance, the control system is configured and operable for determining the one or more pixels by determining whether a light intensity captured by the pixels exceeds a certain predetermined signal to noise ratio (SNR) threshold.

In this regards, the intensity of the returned light being reflected/scattered from the target and captured by the one or more pixels in the at least one image is generally a function of $\tau$ and $1/R$, whereby R is a distance between the imaging module and the target, and $\tau$ is exposure time of the at least one image. According to some embodiments the controller is adapted to estimate change in the distance R of the target during the scanning, and to utilize the change in the distance to dynamically adjust exposure times $\tau$'s of the images to thereby reduce total time T of the scanning cycle while optimizing SNR of the target detection to be above a predetermined threshold.

More specifically in some cases the intensity of the returned light being scattered from the target and captured by the one or more pixels in the sequence of images may be generally proportional to $T/(R^4 * \Omega)$ whereby R is a distance between the imaging module and the target, $\Omega$ is the solid angle of a total field of regard (FOR) covered by the scanning cycle, and T is time duration of the scanning cycle. To this end, according to some embodiments the controller is adapted to carry out a plurality of scanning cycles for tracking the target, while dynamically adjusting at least one of the time durations T of the scanning cycles and the solid angles Ω of the FOR being scanned in the scanning cycles.

For example, during tracking of the target, the controller is adapted to dynamically reduce the time duration T of the scanning cycles as said distance R of the target becomes shorter thereby dynamically optimizing frame rate 1/T of the FOR frames scanned during the one dimensional scanning cycles respectively. Alternatively or additionally, the controller is adapted to determine an angular velocity of the target during tracking of said target and dynamically adjust the solid angle Ω of the FOR covered by one or more scanning cycles to thereby optimize agility of said tracking.

According to some embodiments the system includes a one dimensional photodetector array and wherein the imaging system is configured to image the field of view of the elongated output light beam on the one dimensional photodetector array.

Alternatively, the imaging system includes a two dimensional photodetector array, and preferably imaging system is configured with a field of view larger than a field of view of the illumination module to thereby image the field of view illuminated by the elongated output light beam onto a subset of pixels of the two dimensional photodetector array. To this end, the system may include a noise estimator module (e.g. a false alarm processor) adapted to process images captured by the two dimensional photodetector array to determine false detection of a target by comparing parameters of light intensity captured by the subset of pixels to corresponding noise related parameters associated with light intensity measured by other pixels of the two dimensional photodetector array. The noise related parameters may be estimated for example based on one or more of the following: average background clutter level and slope associated with standard deviation of the clutter, estimated size of structures in the images, comparison between the images.

According to various embodiments of the present invention the scan axis of the 1D scan is a lateral axis travers to the output optical path of the system. The scan axis is generally not orthogonal to the certain lateral axis along which the elongated cross-section of the illumination beam extends (in order to sweep the beam over the field of regards), and preferable it may be parallel to the certain lateral axis of the elongated cross-section of the illumination beam.

For example, according to some embodiments of the present invention the optical path scanning module includes a gimbal rotatable about the scan axis configured and operable for carrying out the angularly deflecting of the direction of the output optical path. the gimbal comprises an actuation module for rotating about the scan axis.

In various implementations the imaging module may be mounted (e.g. directly) on the gimbal, or the imaging module may reside externally to the gimbal (and have a fixed imaging optical path relative thereto). In the latter case the optical assembly of the system may include one or more imaging optical elements arranged on the gimbal an configured and operable for directing light arriving from the output optical path to propagate along the fixed imaging optical path for imaging by the imaging module.

In various implementations the illumination module may be mounted (e.g. directly) on the gimbal, or the illumination module may reside externally to the gimbal and have a fixed light projection optical path along which the light beam emanates from the illumination module. In the latter case, the optical assembly may include one or more light directing optical elements arranged on the gimbal an configured and operable for directing the light beam arriving from the fixed light projection optical path to propagate along the output optical path.

Alternatively or additionally to the use of the gimbal, the optical path scanning module may include one or more scanning optical deflectors that are configured and operable for carrying out the angularly deflecting of the direction of the output optical path. For instance, the one or more scanning optical deflectors comprise at least one MEMs steering mirror To this end, in some implementations the illumination module may have a fixed light projection optical path along which the light beam emanates from the illumination module, and the optical assembly may include one or more optical elements for directing light from the projection optical path to propagate along the output optical path defined by the one or more scanning optical deflectors. Alternatively or additionally, the imaging module may have a fixed imaging optical path for imaging light arriving along which, and the optical assembly may include one or more optical elements for directing light arriving from the output optical path defined by the one or more scanning optical deflectors and to propagate along the imaging optical path for imaging by the imaging module.

According to various embodiments of the present invention, upon detection of the target the control system is configured and operable for initiating a target tracking stage for steering a platform carrying the system towards the target.

In some embodiments during the target tracking stage the control system halts operation of the one dimensional scanning and initiates a snapshot operational mode in which the output light beam is directed towards forwards directions for continuously illuminating the target, and operates the beam shaping module to adjust the cross-section of the output light beam such that a lateral aspect ratio of the cross section of the output light beam is of the order of 1 (e.g. within the range of 1 to 2), and expanding solid angle of the field of view of the output light beam so as to cover an angular extent of the target. To this end, the beam shaping module comprises optical elements configured and operable for adjusting a lateral aspect ratio of the output light beam. Also, the beam shaping module may include an adjustable beam expander configured and operable for expanding the field of view of the light beam.

In some implementations, during the target tracking stage the control system processes images captured by the imaging module to estimate the number of pixels illuminated by light returning from the target and upon determining the number of pixels exceeds a predetermine threshold, operates the beam expander module to expand the field of view of the light beam and the imaging assembly.

According to some embodiments, the control system comprises a steering controller connectable to steering modules of the platform and configured and operable for operation the steering modules for steering the platform towards the target. The steering controller may for example include a closed loop controller adapted for processing the images acquired by the imaging module and operating the steering modules so as to minimize variations between the identities of pixels illuminated by light returning from the target in successive images, thereby minimizing angular velocity of the platform relative to the target and directing the platform to the target.

Other aspects and advantages of the present invention are described in more details below with reference to the drawings.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
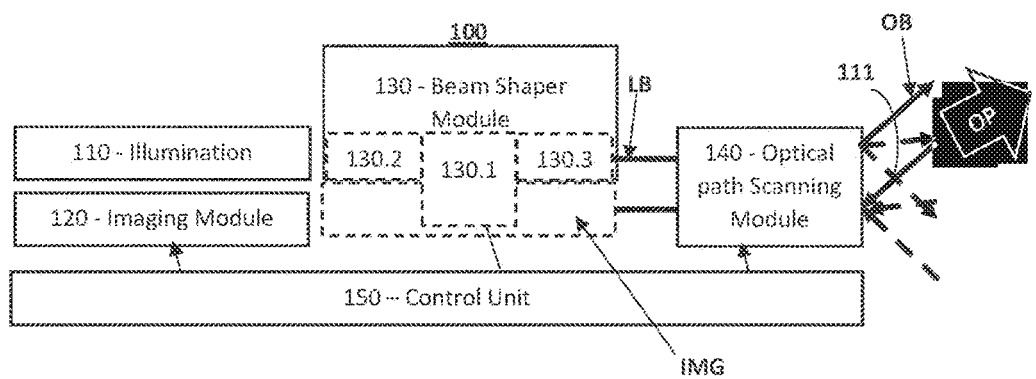
FIG. 1A illustrates block diagram of an active seeker system 100 according to some embodiments of the present invention.
Figure 1B:
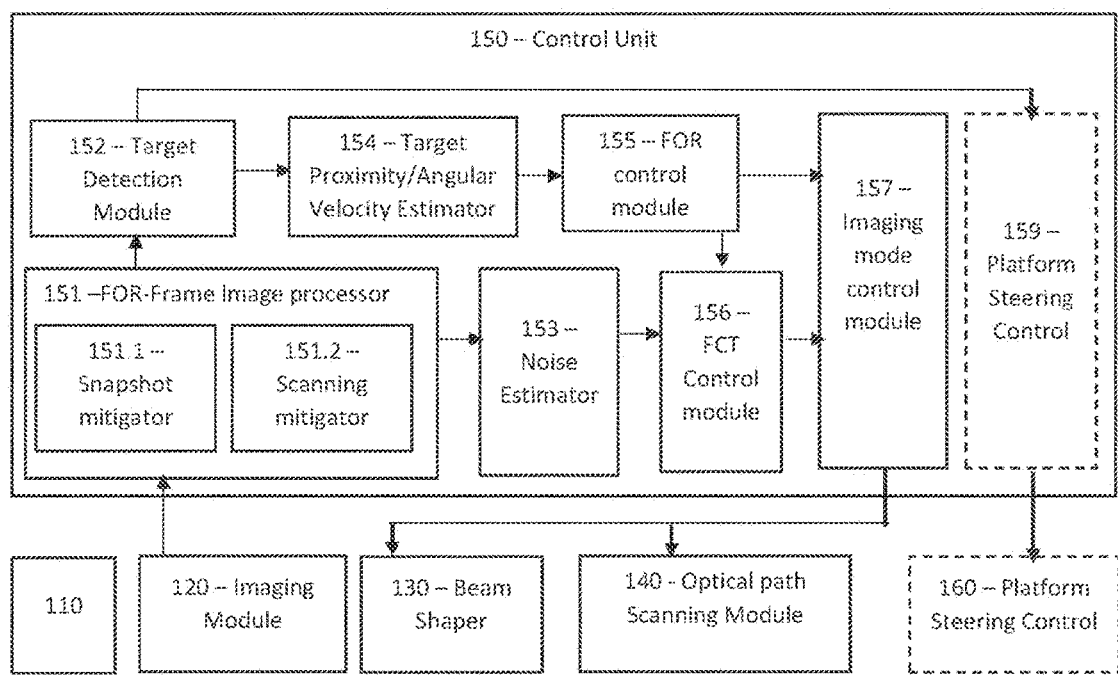
FIG. 1B exemplifies the configuration of a control unit used in the system of FIG. 1A.

FIGS. 1A-1B are block diagrams illustrating an active seeker system 100, according to some embodiments of the present invention.

The active seeker system 100 includes an illumination module 110, a beam shaping assembly 130, a scanning module 140, an imaging module 120, and a controller 150 (which is interchangeably referred to herein as control system/unit).

The illumination module 110 is configured for generating a radiation beam LB for propagation towards an output optical path OP for forming an output beam OB propagating from the system 100 along the output optical path OP. The radiation beam is typically an optical beam, e.g. light in the visual, IR or other regime, but may also be a non-optical beam of electromagnetic radiation—such as radio frequency (RF)). The imaging module 120 is configured for imaging radiation in the spectral regime of the radiation beam LB generated by the illumination module. Indeed the imaging module referred to herein is typically an imager operable in the optical regime of the radiation beam LB. However generally, the imaging module 120 may also be operable for imaging radiation in other spectral regimes (e.g. non-optical), for example it may include a set of one or more antenna modules (e.g. an antenna array) operable for imaging radiation in the RF regime. The beam shaping assembly 130 includes one or more beam shapers configured for shaping the radiation beam LB for at least modifying its FOV, and possibly also modifying the FOV of the imaging module. The beam shaping assembly 130 is configured and operable for adjusting the FOVs of the output beam and possibly also of the imaging modules such that in a snapshot mode of operation, the FOVs cover the entire FOR, while in scanning mode of operation the FOV of the output beam (and possibly also the FOV of the imaging) covers only a part of the FOR. The scanning module 140 is generally operated in the scanning mode and is configured for angularly deflecting a direction of the optical path OP about at least one scan axis/angle to perform one-dimensional scanning. For this purpose the scanning module 140 is configured and operable for swiping the field of view of the output beam OB to cover a field of regard FOR.

It should be noted that in some embodiments of the present invention the optical paths of the imaging module and the illumination module may be separated (e.g. spaced apart co-aligned optical paths). Also the optical assemblies (e.g. the beam shaping modules and/or other optical modules) may be different/separated optical assemblies for the imaging module and the illumination module (although optionally some optical elements may be included along the optical paths of both the imaging and illumination).

To this end according to some embodiments of the present invention the optical/propagation axes/paths of both the illumination module 110 and the imaging module 120, are coupled to the scanning module, so that during the scanning operation both these optical/propagation paths are deflected together by the scanning module to scan the FOR. For instance, according to one embodiments of the present invention, the scanning module 140 includes an actuatable gimbal (e.g. one axis gimbal with appropriate scanning actuator) upon which both the illumination and imaging modules, 110 and 120, are installed/furnished. Accordingly when actuating the gimbal the optical paths of both the illumination module 110 and the imaging module 120 are deflected to scan (i.e. illuminate and image) the FOR. Alternatively or additionally the illumination and imaging modules, 110 and 120, or any one of them may not be directly furnished on the gimbal, but instead the gimbal is furnished with mirrors/deflectors adapted for coupling the optical paths of the illumination and/or imaging modules, 110 and 120, to the output optical path OP which is scanned by the scanning module.

In some embodiments the beam shaping assembly 130 includes at least one global beam shaper 130.1 that is configured and operable to apply global adjustment to the FOV of the output beam OB, which is hereinafter denoted L-FOV (e.g. to enlarge/reduce the total solid angle φ of the L-FOV) while possibly without varying the aspect ratio of the cross-section of the output beam OB. In some embodiments the global beam shaper 130.1 is located exclusively along the optical path of the illumination (while not along the optical path of the imaging module) so that simpler (non-imaging type) beam shaping optics can be used. Alternatively, in some embodiments the optical path of the imaging module 120 also passes through the global beam shaper 130.1, so that global adjustment of the adjustment the L-FOV also adjusts the FOV of the imaging module, which is hereinafter denoted I-FOV. As described in more detail above and below, in some embodiments the FOV of the imaging module, I-FOV, is maintained larger than the FOV of the output beam OB, L-FOV, so that the images captured by the imaging module include also regions at which there should not be a signal/imaging/collection of radiation of the output beam OB returning (reflected/scattered) from the target, but necessarily only clutter radiation and possibly instrumental noise will be sensed/imaged/collected in these regions. Accordingly, these regions serve for assessment of the global noise/clutter that may be affecting the SNR of the target response, thereby enabling to improve the SNR. To this end, the imaging module may have a broader spectral regime than the illuminator. The imaging module may also look on a wider FOV than the output optical path—namely for imaging light/radiation arriving not only from the output optical path.

In some embodiments the beam shaping assembly 130 includes at least one asymmetrical beam shaper 130.2 that is configured and operable to apply asymmetric adjustment to the aspect ratio of the FOV of the output beam OB, L-FOV. As described above and below in more detail the asymmetrical beam shaper 130.2 may be configured and operable for modifying the aspect ratio of the illumination beam in between an elongated aspect ratio, to form an output beam OB with a so called lined shaped cross-section—elongated cross-section extending along a lateral axis traverse to the optical path. In this case the output beam OB will to illuminate the field of view L-FOV with the elongates cross-section. Optionally, the asymmetrical beam shaper is configured for shaping the output beam OB such that the beam has an aspect ratio of 40:1 between the wide and narrow lateral dimensions thereof (e.g. the aspect ratio may be within the range is 10-50 and the angular extent of the beam with respect to its wide axis may be within the range of 1 milirad to 10 milirad). Preferably, in this case FOV of the output beam OB is adjusted such that the width of the longer side/lateral-dimension of the cross-section of the output beam OB is at least as wide as the width of the FOR, in which the target should be detected/tracked, while the width of the shorter side/lateral dimension of the cross-section is smaller than the FOR. This thereby enables scanning the entire FOR in a single 1D scan.

In some embodiments the beam shaping assembly 130 also includes a beam expander module 130.3 configured and operable to expand/contract the solid angle of the illumination FOV, L-FOV, relative to the solid angle of the imaging FOV, I-FOV. This may be used to adjust the imaging and/or illumination FOVs, such that the imaging FOV, I-FOV is larger than the illumination FOV, L-FOV, to thereby enable improved noise/clutter estimation, as described in more detail above and below. It should be noted that alternatively, the system 100 may be configured such that the imaging FOV, I-FOV, is set to be inherently larger than the illumination FOV L-FOV, while without any particular adjustment of the FOVs ratio.

Thus, according to some embodiments, the scanning module 140 is configured for angularly deflecting a direction of the optical path OP about one scan axis (typically a lateral scan axis) to perform one-dimensional scanning. For this purpose the scanning module 140 is configured for swiping the field of view L-FOV of the output beam, preferably together with the field of view I-FOV of the imaging to cover a field of regard FOR. In this case the scanning module includes a gimbal with either deflection mirrors mounted thereon for deflecting the optical path of the output beam and the imaging, or the imaging module 120 and/or the illumination module 110, are mounted directly on the gimbal.

Additionally, optionally in some embodiments the scanning module 140 may also include a rotational actuator coupled to the asymmetrical beam shaper 130.2 and/or to the gimbal for rotating the asymmetrical beam shaper about an axis (e.g. about its optical axis) so that the lined shaped output beam can be rotated to scan the FOR.

As indicated above, the system 100 is adapted to operate in two phases. In the first phase, i.e. target detection phase/stage, the system operates to search and detect the target within a relatively large FOR. In the second phase the system operates for tracking the target. According to some embodiments the system is configured and operable in two operational modes, scanning imaging mode and snapshot mode. As described in more detail below, in some implementations the system is configured for operating in scanning mode during the detection phase, and during the tracking phase, operating in two modes, initially in the scanning mode and then shifting to operate in the snapshot mode (e.g. upon determining that the target approaches). The controller 150, is configured and operable for controlling and/or adjusting the system's operation in the two stages/phases in order to optimize the target's SNR (e.g. to maintain the SNR above a certain threshold level) while also adjusting the agility (speed/rate and/or flexibility) of the detection and/or tracking to enable detection and tracking of fast moving targets with improved SNR and agility, while reducing the illumination power requirements, and thus reducing the weight and size of the system. To this end, the controller 150 is configured and operable for adjusting the illumination and imaging parameters and select the imaging and illumination modes. In some cases the imaging is conducted in snapshot mode, while in other cases the imaging is conducted in scanning mode whereby the scanning module is configured for carrying out for example a one dimensional scanning in a repeated (e.g. cyclic) manner. To do this, the FOR is scanned once per cycle as the scanning module 140 deflects the direction of the output optical path by a certain angle 111, so as to cover the FOR once per cycle.

FIG. 1B, is a block diagram of the system 100, showing in more detail and in a self-explanatory manner, the different modules of the controller 150 and how they are connected to other modules of the system 100. It should be noted that the controller is typically a computerized system, or a combination of a computerized system with an analogue/electronic circuit module, and that the modules 151 to 159 illustrated in the figure may be implemented as software implemented modules, hardware modules, electronic circuits and/or by any combination of the above.

Figure 2A:
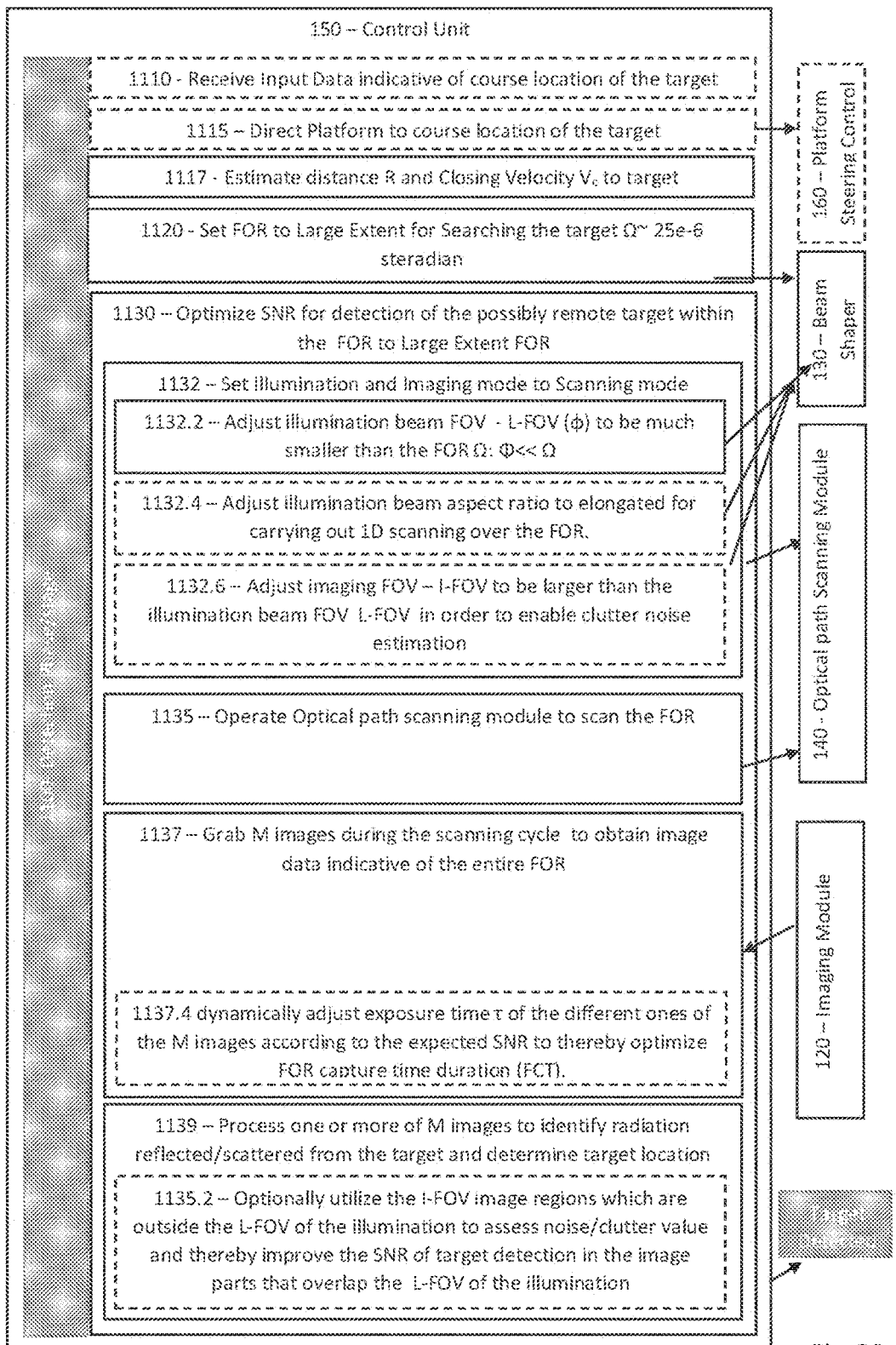
FIGS. 2A and 2B exemplify flow charts of the operation of the control unit in, respectively, the target detection phase in which the target is to be detected, and in the tracking phase which is carried out after the target is detected in order to track the target.
Figure 2B:
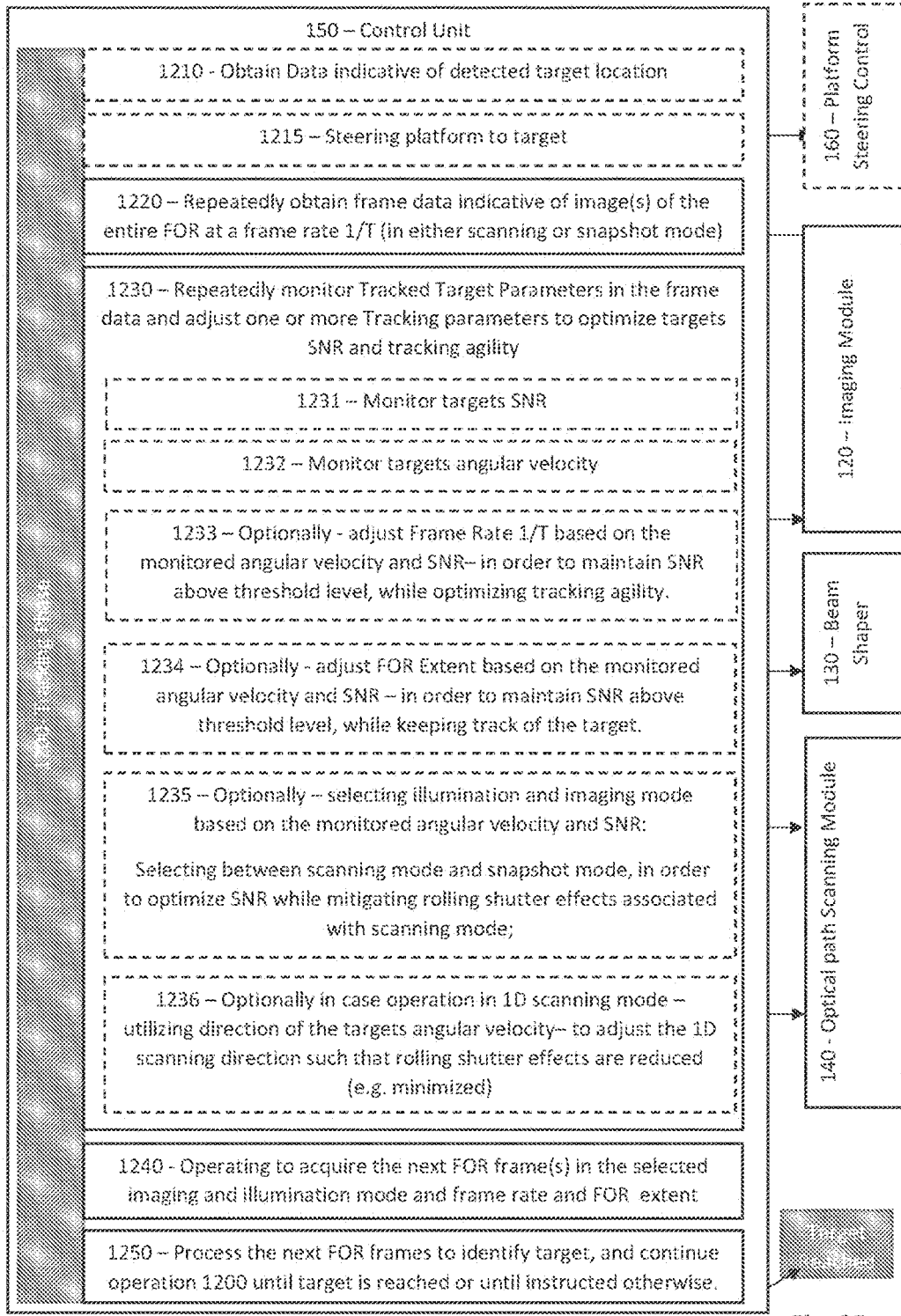

Reference is now made to FIGS. 2A and 2B, which are flow charts illustrating in more details a method 1000 of operation of the controller 150 and of the system 100 carried out according to some embodiments of the present invention in the target detection phase (1100 shown in FIG. 2A), in which the target is to be detected, and in the tracking phase (1200 shown in FIG. 2B), which is carried out after the target is detected in order to track the target.

Turning more specifically to the detection phase 1100 shown in FIG. 2A, the following operations may for example be carried out:

Optionally, in operation 1110, input data indicative of course location of the target to be detected and tracked may be received, for example from an external source such as a radar system external to the system 1000. In this case, the system 1000 (e.g. the steering controller 159) may operate (see optional operation 1115) the platform steering modules to direct the platform towards the course location of the target.

To this end, before detection of the target begins, the seeker obtains its LOS direction. This can be done with a star tracker installed on it, or using a star tracker implemented by its own detection camera. Another option to measure its LOS is gyros (this will be described in more detail further below). Then, in 1115 the seeker aims its line of sight (LOS) toward the seeking area direction (towards the FOR, e.g. towards the FOR's edge). In case the illumination beam is incorrectly aligned with the entire seeking area (i.e. with the FOR), some pre-adjustments may be executed (as illustrated and described for instance with reference to FIG. 5B below).

In operation 1117 the distance R to the target and the closing velocity $V_C$ of the platform to the target are estimated (e.g. based on the data obtained in operation 1110 above). In this regard it should be noted that the term closing velocity refers to the radial velocity between the platform to the target (or in other words to the rate of change dR/dt of the distance to the target).

As described in the following with reference to method 1000, the illuminator is then turned on and target detection and tracking is initiated. The FCT (e.g. the frame rate FR=1/T), and camera exposure time τ, may be dynamically adjusted as time elapses. This provides that the detected signal gets stronger as the seeker-target distance decreases. For each image of capturing the FOR or a part thereof, image analysis algorithms are executed, in order to determine whether radiation (e.g. a flash of radiation) with intensity above a threshold, has reached the detection region of interest in the images. If so, the target is detected, and if not, the target detection phase continues until the target is detected.

As the target detection phase continues the seeker system 100 recalculates predicted/expected position of the target, based on the information that the target has not yet been found to minimize platforms maneuvering and a correction maneuver is then executed.

After detection, of the target, as described below with reference to tracking phase 1200, the seeker keeps illuminating and tracking the target, while adjusting (e.g. expanding) the solid angle of the FOR in case the detected signal becomes too strong, and/or reducing the exposure time (i.e. Integration time) t of the imaging module, in order to prevent image saturation. At some stage, when the target solid angle, with respect to the seeker, becomes larger than the illuminator solid angle, the illuminator beam shaper adjusts the beam shape.

Turning back to the detection phase, at this stage, wherein the target is not yet detected, operation 1120 may be carried out (e.g. by the FOR control module 155, set/adjust the FOR parameters of the system to a certain initial Large Extent for effective searching of the target. The initial large FOR extent may be set for example to be within the range $\Omega \sim 6e^{-6}$ to $50e^{-6}$ steradian.

Moreover, operation 1130 is carried out by the controller 150 in order to optimize SNR of the signal from the target in the detection mode (considering the target may be remote and the FOR is set to Large Extent to enable detection of the target within a large zone). To this end, in order to operate the high enough SNR, at this stage the imaging mode control module 157 carries out operation 1132 sets the Illumination and Imaging mode to a scanning imaging mode, which as indicated above provides improved SNR (as compared to snapshot mode). To this end, the imaging mode control module 157 carries out operation 1132.2 and operates the beam shaper 130 to adjust the angular extent (φ) illumination beam FOV, L-FOV, to be smaller than the angular extent Ω of the FOR: $\varphi \ll \Omega$. Also, optionally, the FCT control module 156 carries out operation 1137 (particularly 1137.2 and 1137.4) to dynamically adjust the exposure time of the imager per each one or more frames based on the expected SNR of the target in the frames, so as to reduce/optimize the time duration T required for capturing images covering of the entire FOR (T is herein referred to as the FOR capturing time duration (FCT) and/or scanning cycle duration).

Optionally, in order to further achieve the improved SNR, while reducing or eliminating rolling shutter effects associated with the scanning, the imaging mode control module 157 may carry out operation 1132.4 and operates the asymmetrical beam shaper 130.2 to adjust the aspect ratio (AR in FIG. 3) of the illumination beam OB such that the cross-section of the output beam OB is elongated (line like), and suitable for carrying out 1D scanning over the FOR. In this case the width (over the long side of the beam matches the width of the FOR, so the entire FOR can be swept in a single one dimensional scan).

Yet additionally, optionally, the imaging mode control module 157 may carry out operation 1132.6 for operating the beam shaper module 130, particularly operation the optional beam expander module 130.3 to set/adjust the ratio of the angular extent (solid angle) of the imaging FOV, I-FOV to the angular extent of the illumination beam FOV L-FOV, such that imaging FOV is larger than the FOV of the illumination beam L-FOV. As indicated above, this provides that inherently some predetermined parts of the images captured from the I-FOV will not be affected by reflection/scattering of the illumination radiation of the output beam from the target. Accordingly, as described below, once receiving such images, the Noise Estimator 153 processes these parts of the images to estimate the level of noise/clutter returning from the environment, thereby enabling to estimate/improve the SNR of the target's signal and/or also utilize false alarm rate (FAR) modules, such as constant FAR (CFAR), to eliminate/reduce/filter out detection false alarms which might be associated with high clutter/noise levels.

Thus, after setting the above parameters (e.g. FOR, τ, T, I-FOV, L-FOV, and/or AR), the imaging mode control module 157 carries out operation 1135 for operating the optical path scanning module 140 to scan the FOR while optimizing/reducing the duration T of the scanning cycle (FCT)) and also carries out operation 1137 for operating the image module 120 to grab/capture a plurality of images, e.g. M images, during each scanning cycle such that image data indicative of the entire FOR, being illuminated at each scanning cycle, is obtained. Optionally, as indicated above, the operation 1135.2 is conducted for operation of the optical path scanning module 140 to carry out a one dimensional scan.

In each scanning cycle, data indicative of the M grabbed images of the FOR, which are captured during the scan cycle, is processed by the target detection module 152, to detect the target.

Optionally, the imaging mode control module 157 dynamically adjust exposure time τ of the different ones of the M images in order to optimize/reduce the FOR capture time duration (FCT), while maintaining SNR above the acceptable threshold level. This may be achieved for example by carrying out optional operations 1137.2 and 1137.4, per each one or few of the M images that are grabbed during the scanning cycle in order to dynamically optimize/reduce the exposure times of the M images. More specifically, in operation 1137.2 imaging mode control module 157 estimates the distance R to the target. The distance R may be estimated for example based on the initial distance R and closing velocity $V_c$, as obtained in operation 1117 above and the time elapsed from that operation. As indicated above, the SNR of the target is generally a function of 1/R (e.g. theoretically proportional to $1/R^4$). Accordingly in operation 1137.2, the expected improvement/change in the SNR due to the reduction/change in the target's distance is estimated. In operation 1137.4, the exposure times τ of one or more of the following of the M images that are to be captured during the scanning cycle are set/adjusted in accordance with the change/improvement of the SNR. More specifically, the SNR is a function of the exposure time τ, and thus upon determining in 1137.2 that an SNR improvement is expected in the next images (due to the closing distance of the target), then in turn the exposure time τ of the following images is shortened in order to reduce the FOR capture time duration (FCT), while maintaining the SNR just above the acceptable threshold.

It should be understood that, according to the dynamic adjustment of the exposure times τ of the M images that are acquired during the scanning cycle, the scanning controller (scanning module) 140 operates with varying scanning velocity (e.g. scanning angular velocity) during the scanning cycle. This thereby yields a time dependent scanning profile that lingers sufficient exposure times {τ} at the respective positions that are required for capturing the respective M images.

The detection module 152 carries out operation 1139 to process the data associated with the M images to identify radiation reflected/scattered from the target and determine target location. This is achieved for example by identifying pixels in those images whose intensity is sufficiently large above the noise, and/or utilizing image analysis algorithms (e.g. statistical image analysis) for determining inter- and/or intra-correlations of pixel intensities in one or more of the images.

To this end, optionally, the FOR frame image processor 151 segments the images received from the imaging module 120, to image segments associated with the region of the imaging FOV, I-FOV, that is being illuminated while the respective images are grabbed (i.e. segments of the images whose FOVs overlap with the L-FOV of the illumination beam OB), which these are referred to herein as "target indicative image segments", and to segments associated with the region of the imaging FOV, I-FOV, that is not illuminated during the capturing of the respective images, which are referred to herein as "clutter indicative image segments". Optionally, the FOR frame image processor carries out operation 1135.2 for utilizing the "clutter indicative image segments", namely image segments, which are outside the L-FOV of the illumination, and provides them to the noise estimator module 153. The latter processes these image segments to assess the value of the global noise/clutter and thereby improve the SNR of target detection in the image parts that overlap with the L-FOV of the illumination, and or to reduce false detection (false alarms) utilizing for example the CFAR technique. Optionally, the FOR frame image processor also includes a scanning mitigator module 151.2, that receives, from the optical scanning module 140, and/or from the imaging mode control module 157, data indicative of the coordinates of each of the M images obtained in the scanning cycle relative to the coordinates of the FOR, and more particularly data indicative of the coordinates of each of the target indicative image segments in the FOR, and merges, e.g. concatenates, the target indicative image segments based on their respective coordinates to obtain an image frame of the FOR, which is indicative of the imaged FOR region during the scanning cycle. The latter is then provided to the detection module 152 for carrying out the operation 1139 described above for detecting the location of the target in the FOR based on the thus obtained image frame of the FOR.

Once the target is detected, the system 100 proceeds to the tracking phase 1200, which is illustrated in FIG. 2B. In the tracking phase the controller repeatedly carries out the following operations which are illustrated in FIG. 2B for tracking the target.

In operation 1210 the controller 150 obtains the data indicative of detected target location, and optionally, in operation 1215 the steering controller 159 utilizes that data for operating the steering controllers of the platform to steer and direct the platform towards the target.

To this end, in order to navigate (maneuver) the platform to the target, the steering controller may include a closed loop controller adapted to operate based on the processed FOR frame images for the steering modules so as to minimize variations between the identities of pixels illuminated by light returning from the target in successive images, thereby minimizing angular velocity of the platform relative to the target and thus directing the platform to the target.

While tracking the target the controller 150, and more specifically the imaging mode control module 157, repeatedly operates to carry out operation 1220 to obtain FOR frame data indicative of image(s) of the entire FOR at a FCT T (in either scanning or snapshot mode). Initially, at least at the beginning of the tracking phase, the FOR frame data is obtained via the scanning imaging mode. In this case operations 1132, 1135 and 1139 described above, and optionally their sub operations, may be carried out to track and locate the target in the scanning imaging mode. Typically when initiating the tracking stage, the FOR is reduced as compared to the FOR of the detection stage and the field of view of the illumination L-FOV is in the order of but may be only somewhat smaller than the FOR.

Generally, as will be described in more detail below, at some stage the imaging mode control module 157 may change the imaging mode to snapshot mode. In this case the imaging mode control module 157 operates the beam shaper as follows. The asymmetrical beam shaper 132.2 adjusts the cross section of the beam to a spot like beam (i.e. having the aspect ratio AR in the order of 1:1). The global beam shaper 132.1 may be adjusted (in case needed) such that the illumination FOVs, L-FOV overlap with the entire FOR (whereby the imaging FOV, I-FOV, may also be adjusted at this stage, or it is set a-priori, to also cover the entire FOR). Accordingly the imaging module is operated to grab a single image capturing the entire FOR, at each FOR frame duration T whereby the integration time τ of the image is set to about τ~T. The FOR image obtained by the imaging module 120 at each FOR frame imaging cycle, is then optionally provided to the FOR frame image processor 151, which may be adapted to carry out operation 1139 on the single image of the FOR. Particularly the snapshot mitigator module 151.1 operates for segmenting the image to the segment showing the entire FOR being illuminated (the target indicative image segment) and segments outside the FOR (the clutter indicative image segment). The target indicative image segment is then provided to the target detection module for detecting the location of the target in the FOR, and the clutter indicative image segment may be provided, as indicated above, to the Noise Estimator 153 for estimating the global level of noise/clutter.

During the tracking (e.g. at each FOR frame imaging cycle or otherwise from time to time, for instance every several cycles), the controller 150 carries out operation 1230 to repeatedly monitor parameters of the tracked target appearing in the FOR frame image/data, and to accordingly adjust one or more of the tracking parameters such as the FOR, the I-FOV, the L-FOV, the FCT (T), the exposure time τ and/or the imaging mode (be it scanning or snapshot mode). In the following the term frame rate (FR) is used to designate the rate 1/T at which FOR frames are acquired (by either scanning or snapshot modes).

Optionally the controller 150 carries out operation 1231 to determine/estimate the target's SNR. For example the controller 150 processes the pixels in which the target appears in the recent (e.g. last) one or more FOR frames, to determine the SNR by which the target was detected. For example determining the extent to which the intensity of these pixels is above the global noise/clutter value, and how significant/ reliable the detection is considering for example the standard-deviation/volatility of the noise (temporally and/or spatial) based on such parameters which are possibly determined by the noise estimate (e.g. considering the clutter imaging segments obtained during one or more cycles). It should be noted that the target's SNR, T-SNR, should be maintained above a certain SNR threshold SNR-TH, in order to assure reliable detection and tracking, but yet, in case of high SNR's well above the threshold, the tracking agility may be increased (e.g. increasing the frame rate 1/T at the expense of somewhat reducing the SNR, as long as it is maintained above the threshold).

Also, optionally the controller 150 carries out operation 1232 to determine/estimate the target's angular velocity relative to the platform (to the system 100). For example the controller 150 may process the locations (coordinates) within the FOR in which the target appears at respective recent (e.g. last) two or more FOR frames, to determine the lateral (e.g. vertical and/or horizontal) velocity of the target in the FOR relative to the platform, which is associated with the target's relative angular velocity. It should be noted that for higher angular velocities a larger FOR solid angle is required for reliable tracking of the target to ensure the target is not lost out of the FOR frames. Typically the closer the target, the higher its angulate velocity relative to the platform may be, and thus a larger FOR solid angle is required, herein after designated R-FOR.

To this end, in optional operation 1234 the controller 150 (e.g. the FOR control module 155) optionally adjusts the FOR extent of the system to the required R-FOR (which is determined based on the monitored angular velocity and SNR), in order to reliably keep track of the target. This may be performed by adjusting the beam shaping module, and or the scanning module to cover the required FOR during the capturing of each FOR frame (during each duration T of the FOR frame grabbing cycle (in snapshot or scanning modes).

In this connection, it should be understood that for the given frame rate T, and given imaging mode (scanning or snapshot), the SNR drops when expanding the FOR, and increases when setting the FOR to smaller extents. Therefore, once determining the required solid angle of the FOR, R-FOR, the expected target's SNR, E-SNR, being the SNR by which the target is expected to be detected in the next FOR frames may be estimated by the controller 150

Accordingly, in operation 1233 the controller 150 (e.g. the frame rate control module 156) may optionally adjust the frame Rate FR=1/T based on the monitored angular velocity and SNR of the target in the preceding FOR frames, as those are determined in operations 1231 and 1232 above This generally yields better agility (i.e. higher frame rates) as the targets approaches/becomes closer to the system. This is because although the target's angular velocity and therefor also the required FOR solid angle may increase, as the target approaches, also the amount of the returning radiation form the target is increased by a factor of $R^{-4}$. Accordingly, utilizing this technique, a more agile tracking is dynamically adjusted as the target approaches, thereby enabling improved tracking of fast moving targets.

Optionally, in operation 1235, the controller 150 (e.g. the Imaging mode control module 157) operates for selecting the illumination and imaging mode based on the monitored angular velocity and SNR. In this regards, the imaging mode control module 157 may determine for example whether to continue operation in scanning mode or to initiate operation in the snapshot mode, depending on the angular velocity and the SNR. In case the expected SNR from the target is sufficiently high (e.g. well above the threshold), while the target is moving at high angular velocity (which may be the case when the target is relatively in close proximity), the imaging mode control module 157 may switch to snapshot mode, which though it is associated with somewhat lower SNR than scanning mode, is less affected/not affected by rolling shutter artifacts that are associated with scanning.

Nonetheless, according to some embodiments, in cases where the expected SNR does not yet permit to operate in the snapshot mode, the imaging mode control module 157 mitigates/reduces the rolling shutter artifacts, by carrying out optional operation 1236 to properly adjust the scanning scheme for mitigating such artifacts. For instance in cases where 1D scanning is involved, imaging mode control module determines the direction of the targets angular velocity in the FOR and preferably adjusts the 1D scanning direction (the scanning axis) to be about perpendicular to the direction of the targets angular velocity such that rolling shutter effects are reduced/suppressed from the FOR frame. This may be achieved by operation the beam shaping module to align elongated scanning beam in about the direction of the angular velocity while operating the gimbal assembly of the scanning module to scan in the perpendicular direction. Such adjustment is possible in embodiments of the system which include a rotation actuator connectable to the scanning module (to the gimbal) 140 and/or to the asymmetrical bema shaping module 130.2, for changing their orientation about the longitudinal axis of the optical path.

Once adjusting the above mentioned parameters the controller 140 continues to carries out operation 1240 for repeatedly operating the system for acquiring the next FOR frame(s) in the selected imaging and illumination mode and frame rate and FOR extent. In operation 1250, the controller 150 further processes the next FOR frames to identify target, and continue operation 1200 until target is reached or until instructed otherwise.

Figure 3:
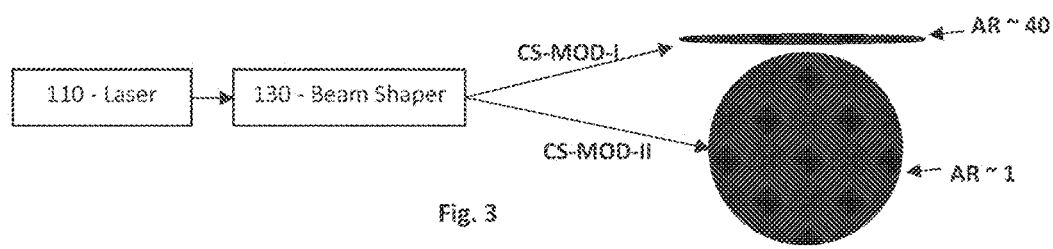
FIG. 3 is a schematic illustration of an example of the system operation while being switched from the scanning mode to the snapshot mode.

FIG. 3 exemplifies the seeker system whose operation is controllably switchable from the one dimensional scanning mode to snapshot mode when the target becomes closer to the system. As shown in the figure, the light source (laser device) 110 produces a light beam of a certain fixed beam shape, which propagates along an optical path and interacts with a beam shaper resulting in an output light beam with a desired cross-section according to the operational mode of the system. In the scanning mode CS-MOD-I, the beam has an elongated cross-section extending along a certain lateral axis traverse to the output optical path for illuminating a certain field of view; and in the snapshot mode CS-MOD-II, the beam has the spot-shape to cover the FOR. In the scanning mode, the beam shaper 130 operates to shape the light beam such that the field of view of the elongated output light beam has a line shape with an lateral aspect ratio, e.g. of the order of 40 (e.g. the aspect ratio may be within the range is 10-50 and the angular extent of the beam with respect to its wide axis may be within the range of 1 to 10 milirad), between the wide and narrow lateral dimensions of the elongated light beam. The optical path scanning module performs one dimensional scanning of many cycles such that in each cycle, the direction of the output optical path is deflected to scan a certain angular extent/segment about the scan axis so as to swipe the light beam to illuminate the FOR of a scanning frame being illuminated and imaged at each one dimensional scanning cycle. The scan axis is a lateral axis travers to the output optical path, and may be horizontal, vertical or axis of rotation; the scan axis is not orthogonal to the certain lateral axis, and may for example be parallel to the certain lateral axis.

For this purpose, as described above, the control system 150 performs a monitoring stage for monitoring the field of regard in search for the target by receiving a sequence of images captured by the imaging system during each one dimensional scanning cycle and processing these images to determine whether a target illuminated by the light beam is detected by one or more pixels, by capturing on the one or more pixels returning light of the light beam being reflected/scattered from the target.

To this end, the controller 150 is preprogrammed with a certain predetermined signal to noise ratio (SNR) threshold, to determine whether a light intensity captured by the pixels exceeds this threshold. The intensity of the returned light is reflected/scattered from the target and captured by the one or more pixels is proportional to $\tau/R^4$ (R is the distance between the imaging module and the target; $\tau$ is the exposure time of each one of the M frames.

The controller 150 operates to dynamically reduce the time duration T of the one dimensional scanning cycles, so as to improve the tracking agility, as the distance R of the target becomes shorter. By this, the frame rate 1/T of the scanning frames scanned during the one dimensional scanning cycles is optimized. This may be achieved by actually reducing (dynamically adjusting) the exposure times of the images captured during the scanning). The distance R can be estimated by applying previous measurements of the target position and velocity (done with other systems such as Radar or IR sensors) to a target state vector prediction model, and measuring the interceptor own position. As also described above, the imaging system may include a one dimensional photodetector array and configured to image the field of view of the elongated output light beam on the one dimensional photodetector array. Alternatively, the imaging system may include a two dimensional photodetector array, and configured to image the field of view illuminated by the elongated output light beam onto a subset of pixels (SS in FIGS. 4A and 4B) of the two dimensional photodetector array. In this case, a spectral line filter can be used in this specific subset to reduce a noise level. A false alarm processor may also be used to process the images captured by the two dimensional photodetector array to determine false detection of a target by comparing parameters of light intensity captured by this subset of pixels to corresponding noise related parameters associated with the light intensity measured by other pixels of the two dimensional photodetector array. The noise related parameters include: background constant level and slope, and/or size of structures, and/or comparison with previous images, clutters etc.

Figures 4A, 4B:
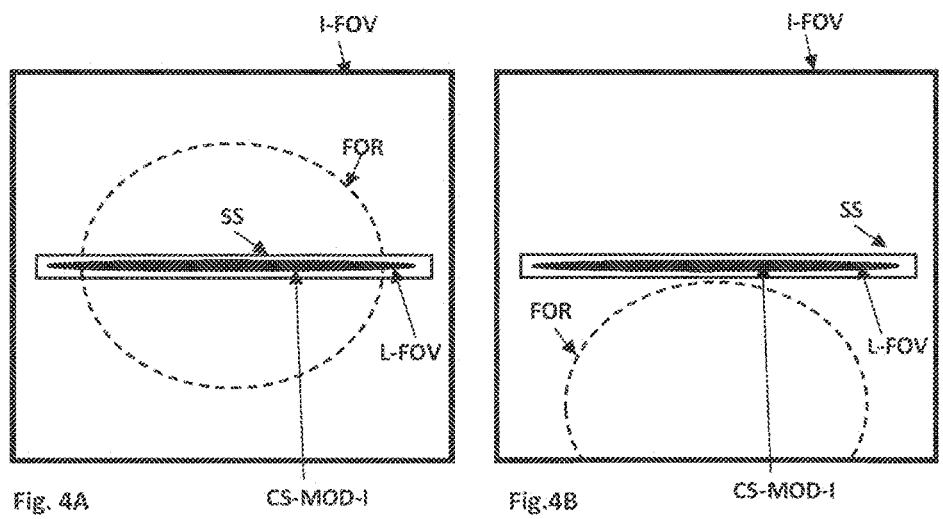
FIGS. 4A and 4B exemplify the FOV of the imaging module in two different scanning times, respectively.

FIGS. 4A and 4B illustrate the FOV of the imaging module in two different scanning times, respectively. In the figures, the large rectangle represents the total FOV I-FOV; the large dashed ellipse is the entire seeking area FOR. The small elongated dark ellipse is the illumination beam of the scanning mode cross-section CS-MOD-I which defines the small seeking area. The small rectangle (SS) around the small seeking area marks the detection region of interest, which is the smallest area on the detector (up to some margin from the small seeking area) where detection signal is possible. Target detection form other regions on the FOV is impossible, since the laser never illuminates other regions of the FOV (the illuminator and imaging module are fixed). As explained above, this small rectangle means fewer false alarm detections and less data to analyze. To further decrease the background noise during detection, a narrow spectral filter, which fits the illuminator wavelength, can be installed on this small rectangle. Such a filter reduced residual background noise (stray light, stars etc.) without affecting the target signal.

FIG. 4A shows the case when the entire seeking area is at the total FOV center, and the small seeking area is a horizontal slice at the entire seeking area center. The situation to which FIG. 4B corresponds is reached at a later scanning stage, after the gimbal scanned upward. At this stage the small seeking area is a narrow slice at the entire seeking area top region. Again, the detection ROI (SS) is placed at the same position on the detector.

Figure 5:
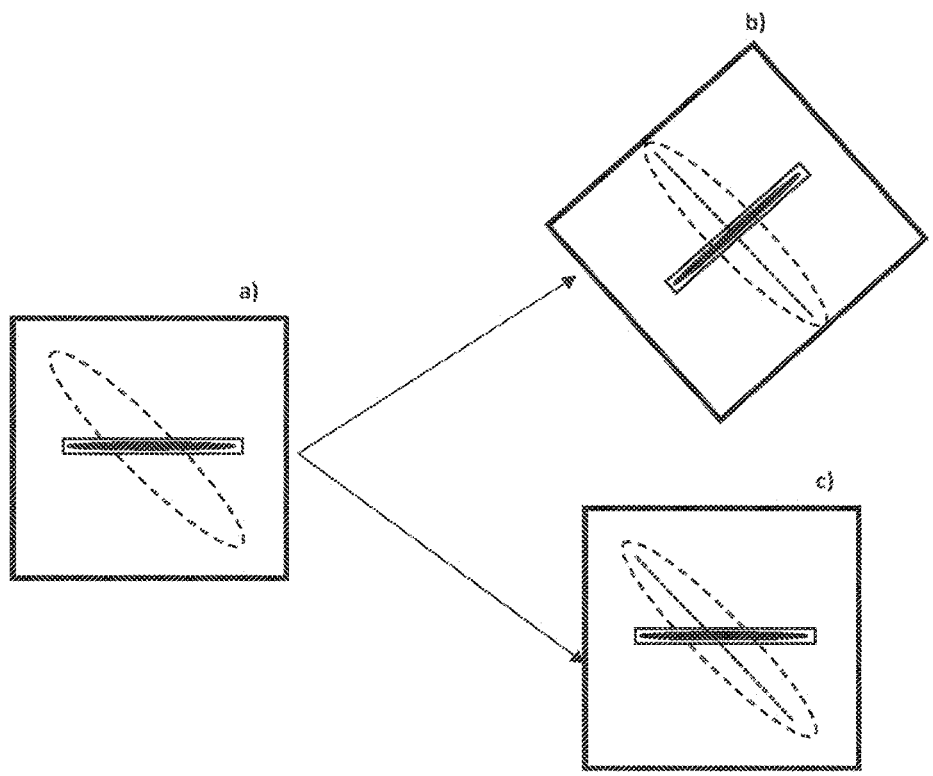
FIGS. 5A to 5C illustrate schematically examples of different scanning modes performed by a one dimensional scanner.

It should be noted that, in general, the gimbal unit aims the payload to the relevant direction and stabilizes its LOS. In the present invention, the gimbal is also used for scanning. If the gimbal has more than one degree of freedom, other scanning options are possible. In this connection, reference is made to FIGS. 5A-5C. FIG. 5A illustrates the case when the entire elongated seeking area is rotated with respect to the reference frame of the imaging module. Single Up/Down scanning, in the reference frame, would not scan the entire seeking area. To this end, as shown in FIG. 5B, a gimbal can be used with a rotation degree of freedom (with respect to the reference frame), and after it an Up/Down degree of freedom (it should be noted that the rotation can be done by the interceptor as well). FIG. 5C shows a simultaneous use of the Up/Down and Left/Right degrees of freedom which allows scanning the entire seeking area, although it is misaligned with the reference frame. The scanning directions/axes are marked with dashed diagonal lines.

Thus, the optical path scanning module may include a gimbal rotatable about the scan axis to provide the angular deflection of the direction of the output optical path. The gimbal may include an actuation module for rotating about the scan axis. The imaging module may be mounted on the gimbal. The illumination module and the imaging module may both be mounted on the movable gimbal.

Generally, the imaging module may be external to the gimbal and have a fixed imaging optical path relative thereto. In this case, the optical assembly includes one or more imaging optical elements arranged on the gimbal and directing light arriving from the output optical path to propagate along the fixed imaging optical path for imaging by the imaging module. Similarly, the illumination module may be external to the gimbal and have a fixed light projection optical path along which the light beam emanates from the illumination module. In this case, the optical assembly includes one or more light directing optical elements arranged on the gimbal for directing the light beam arriving from the fixed light projection optical path to propagate along the output optical path.

The scanning module may include scanning optical deflector(s) to provide the angular deflection of the direction of the output optical path. To this end, MEMs steering mirror(s) may be used.

It should also be noted that illumination module may be configured with a fixed light projection optical path along which the light beam emanates from the illumination module; and/or the imaging module may be configured with a fixed imaging optical path. Accordingly, the optical module includes optical element(s) for directing light from the projection optical path to propagate along the output optical path defined by the scanning optical deflector(s); and/or for directing light arriving from the output optical path defined by the scanning optical deflector(s) to propagate along the imaging optical path.

As described above, the control system 150 performs a monitoring stage to determine whether the target illuminated by the light beam is detected by pixel(s) in the sequence of images. The control system 150 may be further configured to initiate, upon detection of the target, a target tracking stage for steering the platform carrying the system towards the target. During the target tracking stage, the control system 150 operates to halt the operation of the one dimensional scanning, such that the output light beam is directed towards forwards directions continuously so that the target is illuminated continuously during this stage. Also, the control system operates the beam shaping module to form the output light beam as a tracking light beam by adjusting the cross-section of the output light beam such that a lateral aspect ratio of the cross section of the output light beam is of the order of 1, and expanding the solid angle of FOV of the output light beam. To this end, the beam shaping module includes optical element(s) configured and operable for adjusting a lateral aspect ratio of the output light beam, and an adjustable beam expander for expanding the FOV of the light beam.

The control system may be configured for processing the images captured by the imaging module during the target tracking stage, to estimate the number of pixels illuminated by light returning from the target, and, upon identifying that this number of pixels exceeds a predetermine threshold, operating the beam expander module to expand the FOV.

As described above, the control system may include a steering controller 159 connectable to the steering modules of the platform for operating the steering modules for steering the platform towards the target. To this end, the steering controller includes a closed loop controller which processes the images acquired by the imaging module and operates the steering modules so as to minimize variations between the intensities of pixels illuminated by light returning from the target in successive images thereby minimizing angular velocity of the platform relative to the target and directing the platform to the target.

The invention claimed is:

1. A system for mounting on a movable platform for detecting and tracking an object with respect to the movable platform; the system comprising:
    an illuminator configured and operable for generating a light beam for propagation along an output optical path of the system;
    a detector operable for imaging light in a spectral regime of the light beam, which arrives from said output optical path;
    an optical assembly comprising a beam shaper adapted for shaping said light beam to form an output light beam for illuminating a field of view (FOV);
    a scanner configured and operable for angularly deflecting a direction of said output optical path about a scan axis, whereby said scanner is adapted to perform a scanning cycle by swiping the field of view of the output light beam to cover a field of regard (FOR);
    a controller connectable to said detector and configured and operable for monitoring said field of regard in search for said object by receiving a sequence of images captured by said detector during the scanning cycle, and processing said images for detecting the object illuminated by said light beam; said detecting comprises determining whether returning light of said light beam being reflected/scattered from said object is captured by one or more pixels of at least one image in said sequence of images;
    wherein at least one of the following:
    a. intensity of the returned light being reflected/scattered from the object and captured by said one or more pixels in the at least one image is a function of $\tau$ and $1/R$, whereby R is a distance between the detector and the object, and $\tau$ is exposure time of the at least one image; and wherein said controller is adapted dynamically adjust exposure times $\tau$'S of said images according to said intensity to thereby enable to reduce a total time T of said scanning cycle while maintaining a Signal to Noise Ratio (SNR) of said detection above a predetermined threshold; and
    b. intensity of the returned light being reflected/scattered from the object and captured by said one or more pixels in the sequence of images is proportional to $T/(R4*\Omega)$ whereby R is a distance between the detector and the object, $\Omega$ is the solid angle of a total field of regard (FOR) covered by the scanning cycle, and T is time duration of the scanning cycle; and wherein said controller is adapted to carry out a plurality of scanning cycles for tracking the object, while dynamically adjusting at least one of the time durations T of the scanning cycles and the solid angles $\Omega$ of the FOR being scanned in said scanning cycles.

2. The system of claim 1, wherein said output light beam has an elongated cross-section extending to cover a first lateral dimension of said FOR and the scanner is configured and operable for carrying out said one dimensional scanning cycle by deflecting the direction of said output optical path to scan a certain angular extent about said scan axis so as to swipe said light beam to cover a second dimension of the FOR being imaged in the one dimensional scanning cycle.

3. The system of claim 2 wherein said beam shaper is configured and operable for shaping said light beam such that the field of view of the elongated output light beam has a line shape with a lateral aspect ratio of the order of 40 between wide and narrow lateral dimensions of said elongated light beam.

4. The system of claim 1, wherein during tracking of said object, said controller is adapted to dynamically reduce the time duration T of the scanning cycles as said distance R of the object becomes shorter thereby dynamically optimizing frame rate 1/T of the FOR frames scanned during the scanning cycles respectively.

5. The system of claim 1, wherein said controller is adapted to determine an angular velocity of the object during tracking of said object and dynamically adjust the solid angle $\Omega$ of the FOR covered by one or more scanning cycles to thereby optimize agility of said tracking.

6. The system of claim 1, wherein the detector is configured with a field of view larger than a field of view of said illuminator to thereby image the field of view illuminated by the output light beam onto a subset of pixels of a two dimensional photodetector array of the detector.

7. The system of claim 6, comprising a false alarm processor adapted to process images captured by the two dimensional photodetector array to determine false detection of an object by comparing parameters of light intensity captured by said subset of pixels to corresponding noise related parameters associated with light intensity measured by other pixels of the two dimensional photodetector array.

8. The system of claim 7, wherein the noise related parameters are estimated utilizing one or more of the following: average background clutter level and slope associated with standard deviation of said clutter, estimated size of structures in said images, and comparison between said images.

9. The system of claim 1, wherein at least one of the following:
   said scan axis is a lateral axis traverse to said output optical path;
   said scan axis is not orthogonal, and is preferably parallel, to said certain lateral axis along which the light beam is elongated.

10. The system of claim 1, wherein said scanner comprises a gimbal rotatable about said scan axis configured and operable for carrying out said angularly deflecting of the direction of the output optical path; and wherein said gimbal comprises an actuator for rotating about said scan axis.

11. The system of claim 10, wherein at least one of the following:
   said detector is mounted on said gimbal;
   said detector is external to said gimbal and has a fixed imaging optical path relative thereto, and wherein the optical assembly comprises one or more imaging optical elements arranged on said gimbal and configured and operable for directing light arriving from said output optical path to propagate along said fixed imaging optical path for imaging by said detector.

12. The system of claim 10, wherein at least one of the following:
   said illuminator is mounted on said gimbal;
   said illuminator is external to said gimbal and has a fixed light projection optical path along which said light beam emanates from the illuminator, and wherein the optical assembly comprises one or more light directing optical elements arranged on said gimbal and configured and operable for directing said light beam arriving from said fixed light projection optical path to propagate along said output optical path.

13. The system of claim 1, wherein said scanner comprises one or more scanning optical deflectors configured and operable for carrying out said angularly deflecting of the direction of the output optical path.

14. The system of claim 1, wherein said beam shaper is configured and operable for adjusting a lateral aspect ratio of the output light beam; and
   wherein the controller is configured to operate, upon detection of said object, for initiating a tracking stage for tracking the location of the object; and wherein during said tracking stage the controller halts operation of said scanning and initiates a snapshot operational mode in which the output light beam is directed for continuously illuminating the object, and operates said beam shaper to adjust the cross-section of said output light beam such that a solid angle of the field of view of said output light beam covers an angular extent of said object.

15. The system of claim 14, wherein said beam shaper is configured and operable for expanding the field of view of said light beam; and wherein during said tracking stage the controller processes images captured by said detector to estimate the number of pixels illuminated by light returning from said object and upon determining that said number of pixels exceeds a predetermined threshold, operates said beam shaper to expand said field of view of the light beam and the detector.

16. The system of claim 14, wherein the controller comprises a steering controller connectable for controlling steering modules of said platform according to the tracked location of the object.

17. A controller configured and operable to operate a detection and tracking system, which is mounted on a movable platform, for detecting and tracking an object; the detection and tracking system comprising:
   an illuminator capable of generating an illumination beam for propagation along an output optical path;
   a beam shaper capable of adjusting a field of view (FOV) solid angle of said light beam to form an output light beam with said adjusted FOV propagating along the output optical path;
   a detector for imaging light arriving from a certain FOV about said output optical path, with light spectra in the spectral regime of said light beam; and
   a scanner capable of angularly deflecting a direction of said output optical path about a scan axis; and
   wherein the controller is configured and operable to:
   carry out a detection stage to detect an object within a field of regard (FOR) with respect to the movable platform, wherein said detection stage comprises:
   (i) operating said beam shaper to adjust said FOV of the output light beam to extent smaller than said FOR;
   (ii) operating said scanner to carry out a scan of the FOR by deflecting the FOV of said illumination beam to cover the FOR, and
   (iii) during said scan, operating said detector for capturing a plurality of images of different sections of said FOR, to thereby obtain FOR frame image data indicative of an image of said FOR; and
   (iv) processing said FOR frame image data to identify therein one or more pixels indicative of detection of said object and upon said detection of said object carrying out a tracking stage for tracking said object;
   wherein carrying out said tracking stage comprises sequentially capturing a plurality of FOR frames image data indicative of the FOR, and processing the FOR frame image data to identify the object therein; and at least one of the following:
   a. intensity of the returned light being reflected/scattered from the object and captured by said one or more pixels in the at least one image is a function of $\tau$ and $1/R$, whereby R is a distance between the detector and the object, and $\tau$ is exposure times of the at least one image of the plurality of images of different sections of said FOR; and wherein said controller is adapted dynamically adjust the exposure times $\tau$ during the sequential capturing of the plurality of FOR frames image data according to said intensity to thereby enable to reduce a total time T of said scanning cycle while maintaining a Signal to Noise Ratio (SNR) above a predetermined threshold; and
   b. intensity of the returned light being reflected/scattered from the object and captured by said one or more pixels is a function of $T/(R^4*\Omega)$ whereby R is a distance between the detector and the object, $\Omega$ is the solid angle of a total field of regard (FOR) covered by the scanning cycle, and T is time duration of the scanning cycle; and wherein said controller is adapted to carry out a plurality of scanning cycles for capturing plurality of FOR frames image data, while dynamically adjusting at least one of the time durations T of the scanning cycles and the solid angles $\Omega$ of the FOR being scanned in said scanning cycles.

18. The controller of claim 17, wherein in (iii) the controller system is configured and operable to dynamically adjust exposure times of said plurality of images during the capturing of the plurality of images to thereby optimize a time required for said detection of the object.

19. The controller of claim 17, adapted to dynamically adjust a selected imaging mode for capturing the FOR frame image data during said tracking, whereby said selected imaging mode is selected as one of:
- a scanning imaging mode operable for obtaining a FOR frame image data by scanning the FOR with said illumination beam and capturing a plurality of images of different sections of said FOR; and
- a snapshot imaging mode in which the entire FOR is simultaneously flooded by the output light beam and a snapshot of the entire FOR is captured on the detector.

20. The controller of claim 19, wherein at least one of the following:
- the solid angle extent of the FOR of capturing a certain FOR frame image data is adjusted based on an estimated angular velocity of the object appearing in preceding FOR frames image data;
- the frame rate 1/T for capturing a certain FOR frame image data is adjusted based on an estimated Signal to Noise Ratio (SNR) of the object in preceding FOR frames image data; and
- the selected imaging mode for capturing a certain FOR frame image data is adjusted based on an estimated distance of the object.

21. The system of claim 17, wherein said output light beam having an elongated FOV extending to cover a first lateral dimension of said FOR and the scanner is configured and operable for carrying out a one dimensional scanning cycle by deflecting the elongated FOV of said output light to cover the FOR.

* * * * *